United States Patent [19]

Francisco

[11] Patent Number: 4,732,695

[45] Date of Patent: Mar. 22, 1988

[54] PAINT STRIPPER COMPOSITIONS HAVING REDUCED TOXICITY

[75] Inventor: Roland L. Francisco, Walnut, Calif.

[73] Assignee: Texo Corporation, Cincinnati, Ohio

[21] Appl. No.: 9,937

[22] Filed: Feb. 2, 1987

[51] Int. Cl.$^4$ .............................................. C11D 7/50
[52] U.S. Cl. .................................... 252/162; 252/170; 252/171; 252/558; 252/DIG. 8; 134/38
[58] Field of Search ............... 252/162, 170, 171, 558, 252/DIG. 8; 134/38

[56]  References Cited

U.S. PATENT DOCUMENTS

| | | | |
|---|---|---|---|
| 4,085,059 | 4/1978 | Smith et al. | 134/38 |
| 4,120,810 | 10/1978 | Palmer | 252/171 |
| 4,276,186 | 6/1981 | Bakos et al. | 252/170 |
| 4,579,627 | 4/1986 | Brailsford | 252/DIG. 8 |
| 4,666,626 | 5/1987 | Francisco | 252/170 |

Primary Examiner—A. Lionel Clingman
Assistant Examiner—Hoa Van Le
Attorney, Agent, or Firm—Max Geldin

[57]  ABSTRACT

A paint stripper and coatings remover composition free of methylene chloride, consisting essentially of effective amounts of benzyl alcohol, an aromatic naphtha and a pyrrolidone, preferably N-methyl 2-pyrrolidone. The composition preferably also contains effective amounts of a thickener, particularly hydroxy propyl methyl cellulose, a wetting agent, preferably dodecyl benzene sulfonate, to facilitate emulsification of the composition with water, and an amine activator, preferably monoethanolamine. The above components are preferably employed in certain ranges of proportions.

13 Claims, No Drawings

PAINT STRIPPER COMPOSITIONS HAVING REDUCED TOXICITY

BACKGROUND OF THE INVENTION

This invention relates to a paint stripper and is particularly directed to an effective paint stripper free of methylene chloride and of reduced toxicity for removing paint from various equipment employed in automobile paint booths rapidly and efficiently.

Various types of paint strippers are presently being employed, particularly for removing paint from cleaning equipment in automobile paint booths, including walls, paint hoses, spray equipment, and the like. Typical paint strippers for this purpose generally are methylene chloride based strippers, that is, they contain a substantial amount of methylene chloride. Although such paint strippers have generally proved effective, it has recently been found that methylene chloride has a high degree of toxicity and has a carcinogenic effect, and it is now accordingly found desirable to avoid the use of methylene chloride in paint strippers.

In my copending U.S. application, Ser. No. 842,158, filed Mar. 21, 1986, now U.S. Pat. No. 4,666,626, there is disclosed and claimed an effective paint stripper composition free of methylene chloride and containing oxohexyl acetate as the chief cleaning agent.

In U.S. Pat. No. 4,120,810 to Palmer, there is disclosed and claimed a paint remover having improved safety characteristics consisting essentially of a mixture of two chemicals, the first chemical being preferably N-methyl 2-pyrrolidone, and making up approximately 15 to 60 mole percent of the mixture, and the second chemical comprising preferably blends of alkyl naphthalenes and alkyl benzenes, and making up at least 35 mole percent of the mixture. In Example 9 of the patent, it is stated that a 50 volume percent mixture of N-methyl pyrrolidone (NMP) and benzyl alcohol was tested and found to have inferior paint removal ability relative to either of the two pure components, i.e., the mixture of benzyl alcohol with NMP had substantially less effectiveness than either pure component.

Further, certain presently employed paint strippers are not readily mixed and formulated to produce a paint stripper having the proper viscosity and consistency for efficient spraying application employing a spray gun, particularly on vertical and overhead surfaces, such as ceilings. In addition, certain of the presently utilized paint strippers are hazardous in that they are readily flammable and combustible.

It is accordingly an object of the present invention to provide an effective non-methylene chloride paint stripper composition, particularly applicable for removing paint from walls, floors and cleaning equipment in automobile paint booths.

Another object is to provide a paint stripper composition free of methylene chloride, which can be readily formulated for efficient spray gun application.

Another object is the provision of a paint stripper composition of the above type which rapidly removes paint from the equipment and areas in paint booths without requiring inordinate periods of waiting or soaking.

A still further object is to provide a non-methylene chloride paint stripper composition having non-carcinogenic components and which is essentially non-flammable and non-hazardous to handle by personnel.

Yet another object is to provide a paint stripper composition of the above type which emulsifies with and can be completely removed by water.

SUMMARY OF THE INVENTION

The above objects and advantages are achieved according to the invention, and an effective paint stripper composition is provided, which is free of methylene chloride and has reduced toxicity characteristics, consisting essentially of three components. More particularly, the stripper composition of the invention consists essentially of a mixture of the three following essential components: (1) a hydrocarbon 2-pyrrolidone, preferably N-methyl 2-pyrrolidone; (2) a mixture of aromatic hydrocarbons, known as "aromatic naphtha"; and (3) benzyl alcohol.

The composition preferably also contains certain other components including a thickener, preferably a hydroxy propyl methyl cellulose, a surface active agent, preferably dodecyl benzene sulfonate, and an amine, preferably monoethanolamine. The above components are employed in effective amounts, particularly in certain ranges of proportions, as set forth in greater detail below.

It was unexpectedly found that by incorporation of a substantial amount of benzyl alcohol, with the mixture of N-methyl 2-pyrrolidone and aromatic hydrocarbon blend, the resulting composition has at least equal paint removal effectiveness as the mixture of the two essential components, namely, the pyrrolidone and aromatic hydrocarbon blend, of the above Palmer patent, while reducing the amounts of the latter two components employed in the invention composition and at the same time obtaining the additional advantage of enhancing the thickening and swelling characteristics of the thickening agent to achieve a controlled and proper viscosity for spraying the composition. The paint stripper effectiveness of the composition containing benzyl alcohol in combination with both the pyrrolidone and the aromatic hydrocarbon components was surprising in view of the teaching of the above Palmer patent, that a mixture of NMP and benzyl alcohol had inferior paint removal effectiveness relative to either of the pure components.

In addition, the paint remover composition of the invention has reduced toxicity and reduced noxious odor as compared to the composition of the Palmer patent due to the replacement of a substantial proportion of the mixture of the pyrrolidone and aromatic hydrocarbons blend thereof, with benzyl alcohol.

The invention composition is particularly effective for cleaning the walls, floors and all equipment, such as the spray equipment, hoses and enclosures, of paint booths, for example, of an automobile assembly plant.

The paint stripper composition of the invention, free of methylene chloride, is readily formulated and applied as by spraying, and the paint is removed easily without any substantial waiting or soaking, followed by water rinsing to clean the removed paint. The paint stripper composition hereof readily emulsifies with water and is removed completely by water. As formulated, the paint stripper composition of the invention is essentially non-flammable, non-carcinogenic, and non-toxic.

DETAILED DESCRIPTION OF THE PREFERRED EMBODIMENTS

The paint stripper composition of the invention is prepared by mixing together the three essential components, namely, benzyl alcohol, the pyrrolidone, and the aromatic hydrocarbon blend.

A thickener component, a wetting agent and other optional components, such as monoethanolamine, are also incorporated, as described below.

The benzyl alcohol component, in conjunction with the aromatic hydrocarbon or aromatic naphtha, and the pyrrolidone component, preferably N-methyl 2-pyrrolidone, enhances the thickening and swelling characteristics of the thickening agent, preferably hydroxy propyl methyl cellulose, so as to substantially improve the spraying characteristics of the composition. Thus, the benzyl alcohol blends with the other two above-noted essential components and is not only responsible for the swelling and solubilizing of the thickening agent, but also acts as a powerful solvent and cleaning agent, in conjunction with the pyrrolidone and aromatic hydrocarbon components, in achieving effective cleaning and paint stripping. Thus, the benzyl alcohol component functions in combination with the pyrrolidone and aromatic hydrocarbon components to produce a balanced blend of three different solvents which readily penetrate and react with the paint coating to remove same.

The amount of benzyl alcohol component employed can range from about 20 to about 50%, preferably about 20 to about 30%, by weight of the paint stripper composition. By using a relatively high percentage of the benzyl alcohol component in the paint stripper composition, the viscosity and sprayability of the paint stripper composition can be controlled due to the swelling effect of the benzyl alcohol on the thickening agent, the degree of thickening of the composition depending upon the amount of benzyl alcohol employed. This effectively aids in monitoring the viscosity of the blend so that the viscosity is sufficient to permit the paint stripper to effectively stick to and clean vertical walls as well as overhead surfaces, such as ceilings, without any substantial running.

In addition, the use of benzyl alcohol as an essential component in substantial proportions, renders the composition containing the three essential components less toxic in that the use of benzyl alcohol reduces the total amount of the other two essential components, that is, the pyrrolidone and aromatic hydrocarbon components, employed in the composition.

The second essential component is the aromatic hydrocarbon solvent. The preferred aromatic solvent is a blend of aromatic hydrocarbons referred to as "aromatic naphtha" or "heavy aromatic naphtha", an exemplary composition of this type being marketed as "SC 100" by Chem Central. Such mixtures contain essentially aromatic hydrocarbons, e.g., a mixture of alkyl benzenes and alkyl naphthalenes. Other equivalent mixtures can be employed, such as the material marketed as "HYSOL 10" by Ashland Chemical and "Aromatic 100" by Exxon Chemicals. This aromatic solvent effectively functions as a cleaning agent in conjunction with the pyrrolidone component and the benzyl alcohol, and results in reduction in toxicity of the overall composition. Such aromatic solvent material also functions to raise the flash point and thus reduce flammability of the stripper. The amount of the aromatic hydrocarbon component employed can range from about 30 to about 70%, preferably about 30 to about 60%, by weight of the composition.

It was particularly unexpected to find that such aromatic naphtha apparently activates the pyrrolidone and benzyl alcohol components to provide improved paint removal and cleaning by the resulting composition and contrary to the inferior paint removal results obtained from a mixture of the pyrrolidone and benzyl alcohol, in the absence of the aromatic naphtha, as noted in Example 9 of the above Palmer patent.

The third essential component of the paint stripper composition of the invention is a pyrrolidone, preferably N-methyl 2-pyrrolidone. Another pyrrolidone component which can be employed is N-vinyl 2-pyrrolidone. The pyrrolidone component has good properties as a paint diluent and has solvent properties which enhance penetration and stripping of the paint in conjunction with the benzyl alcohol and aromatic hydrocarbon components. The pyrrolidone component also increases the flash point of the composition. This material, e.g., the material marketed as "M-Pyrol" by GAF, is employed in an amount ranging from about 10 to about 40%, preferably about 10 to about 20%, by weight of the composition.

A thickener to maintain adherence of the paint stripper composition, particularly on inclined or vertical surfaces, is also required. The preferred thickening agent in the paint stripper composition of the invention is hydroxy propyl methyl cellulose, a thickening agent of this type being marketed as "Klucel" by Hercules. Such thickening agent is generally employed in an amount ranging from about ½ to about 2%, preferably about ½ to about 1%, by weight of the composition. If desired, similar thickening agents, such as methyl cellulose, e.g., the material marketed as "METHOCEL F-4M" by Dow Chemical Co., can be employed.

Also included in the paint stripper of the invention is a wetting agent which functions as a surface active agent. The incorporation of this material renders the entire blend readily emulsifiable when rinsed with water. The preferred wetting or surface active agent is dodecyl benzene sulfonate, marketed as "Calsoft F-90" by Pilot Chemical Company. It is one of the most effective and powerful wetting agents for the invention composition and has good compatibility with the other components. Another suitable wetting agent is sodium xylene sulfonate, which can be used separately or in combination with a sodium alkyl aryl sulfonate. The amount of such wetting agent which is employed can range from about 0.5 to about 3%, by weight of the composition.

Another optional component which also can be incorporated into the paint stripper composition of the invention is an amine, such as monoethanolamine. Such amine functions as an accelerator or activator to facilitate rapid stripping and removal of the paint polymer. Other amines, such as triethylamine or triethanolamine, can be employed. The amount of the amine incorporated into the paint stripper composition can range from about 0.5 to about 5%, preferably about 0.5 to about 2%, by weight of the composition.

Another optional component which can be employed is methanol. It functions to solubilize and swell the thickening agent. The amount of methanol employed can range from 0 to about 5%, for example, about 2 to about 5%, by weight of the composition.

However, due to its toxicity and flammability, the use of methanol is not preferred in the invention composition.

Paint stripper compositions according to the invention are set forth in the following table:

TABLE

| Components | COMPOSITIONS Percent by Weight | | |
|---|---|---|---|
| | A | B | C |
| Benzyl alcohol | 30 | 40 | 25 |
| Klucel | 1 | 1 | 1 |
| Methanol | — | — | 5 |
| SC 100 | 50 | 48 | 50 |
| N—methyl 2-pyrrolidone | 17 | 10 | 17 |
| Calsoft F-90 | 1 | 1 | 1 |
| Monoethanolamine | 1 | — | 1 |
| | 100 | 100 | 100 |

Compositions A and B are particularly preferred and highly effective formulations for paint stripping according to the invention.

It should be noted that paint stripper compositions of the invention containing as little as 10% of the pyrrolidone component by weight, when employed in conjunction with a substantial amount, 40%, by weight of benzyl alcohol, and 48%, by weight of the aromatic hydrocarbon component, as exemplified by Composition B, are effective paint strippers, as compared to the paint stripper compositions of the above Palmer patent, which contain a larger amount of the pyrrolidone, and in the absence of the essential benzyl alcohol of the paint stripper composition hereof.

Formulations A and B are prepared by initially adding the Klucel to the SC100, followed by addition of the benzyl alcohol, and then the remaining components noted above.

Formulation C above can be prepared similarly to Compositions A and B with the methanol added following addition of the benzyl alcohol.

The paint stripper compositions of the invention are effective for cleaning all equipment in paint booths, e.g., of an automotive assmebly line, including walls, paint hoses, steel plates, automatic spray equipment, enclosures, glass walls, gratings, chain conveyors, and covers. It can also be employed to clean the floors of paint spills, such as at paint storage rooms or paint mix rooms, and the floors particularly at the end of automotive paint booths where the paint generally drips off the item being painted.

The stripper compositions of the invention can be applied by several methods, including spraying with a paint gun or by application of the paint stripper formulation using a roller or a scrub brush. Spraying is preferred since it is most rapid and can be more readily controlled to deliver the desired effective amount of paint stripper to an area to be treated.

After application of the paint stripper composition to the item being cleaned, relatively little waiting time is required, such as for soaking and the like, and the area sprayed can be rinsed with water within a short time after applying the stripper, e.g., 10 to 30 minutes.

The paint stripper composition of the invention is water soluble and is essentially non-carcinogenic, non-toxic, non-flammable and is environmentally safe for water and waste treatment.

The following are examples of practice of the invention:

EXAMPLE I

The wall of an enclosure was coated by spraying with a color coat of an acrylic-polyurethane composition, over which was sprayed a clear seal coat containing high polymer polyurethane solids.

The resulting coatings, simulating coatings employed in the automobile industry, were allowed to air dry. The dried coatings were then sprayed with Composition A of the Table above, and the sprayed coating was permitted to soak for a short period of time. After about 15 to about 20 minutes, the wall containing the paint coating and to which the stripper Composition A was applied, was rinsed thoroughly with water, resulting in emulsification of the treated paint coating and thorough removal thereof from the wall.

EXAMPLE II

Compositions B and C, when similarly applied by spraying, respectively, to a painted wall as described in Example I above, produce results with respect to removal and cleaning of the paint or coated surface, similar to the results obtained in Example I, Composition B requiring a small increase in treatment time to achieve the same results as Composition A.

It will be understood that the invention composition is also effective as a coatings remover generally, e.g., for removing or stripping organic coatings, such as varnish or lacquer coatings.

From the foregoing, it is seen that the invention provides an efficient paint stripper and coatings remover composition, free of methylene chloride, and particularly advantageous for use in paint booths of automotive assembly plants, for readily removing paint from the walls, floors, and equipment thereof, rapidly and with simple water rinsing, the composition being non-carcinogenic and non-hazardous for handling by personnel, and being essentially non-flammable.

Since various changes and modifications of the invention will occur to those skilled in the art, the invention is not to be taken as limited except by the scope of the appended claims.

What is claimed is:

1. A paint stripper and coatings remover composition consisting essentially of a mixture of effective amounts of benzyl alcohol, an aromatic naphtha, and a substance selected from the group consisting of N-methyl 2-pyrrolidone and N-vinyl 2-pyrrolidone.

2. The composition of claim 1, containing about 20 to about 50% of benzyl alcohol, about 30 to about 70% of aromatic naphtha, and about 10 to about 40% of said substance, by weight.

3. The composition of claim 1, containing about 20 to about 30% of benzyl alcohol, about 30 to about 60% of an aromatic naphtha, and about 10 to about 20% of said substance, by weight.

4. The composition of claim 1, said substance being N-methyl 2-pyrrolidone.

5. The composition of claim 1, said aromatic naphtha consisting essentially of a mixture of alkyl benzenes and alkyl naphthalenes.

6. The composition of claim 1, further including an effective amount of a thickening agent.

7. A paint stripper and coatings remover composition free of methylene chloride, and containing, by weight, about 20 to about 50% benzyl alcohol, about 30 to about 70% of a heavy aromatic naphtha, about 10 to about 40% of N-methyl 2-pyrrolidone, about 0.5 to about 2% hydroxy propyl methyl cellulose, and about 0.5 to about 3% dodecyl benzene sulfonate, by weight.

8. The composition of claim 7, further including about 0.5 to about 5% monoethanolamine and 0 to about 5% methanol, by weight.

9. The composition of claim 7, containing about 20 to about 30% benzyl alcohol, about 30 to about 60% heavy aromatic naphtha, about 10 to about 20% N-methyl 2-pyrrolidone, and about 0.5 to about 1% of hydroxy propyl methyl cellulose, by weight.

10. The composition of claim 9, further including about 0.5 to about 2% monoethanolamine and 0 to about 5% methanol, by weight.

11. The composition of claim 9, said heavy aromatic naphtha consisting essentially of a mixture of alkyl benzenes and alkyl naphthalenes.

12. A paint stripper and coatings remover composition consisting essentially of a mixture of effective amounts of benzyl alcohol, an aromatic naphtha, and a substance selected from the group consisting of N-methyl-2-pyrrolidone and N-vinyl 2-pyrrolidone, and further including a surface-active agent for emulsification of said mixture with water.

13. A paint stripper and coatings remover composition consisting essentially of a mixture of effective amounts of benzyl alcohol, an aromatic naphtha, and a substance selected from the group consisting of N-methyl 2-pyrrolidone and N-vinyl 2-pyrrolidone, and further including an amine activator.

* * * * *